US011526615B2

(12) United States Patent
Greenhalgh et al.

(10) Patent No.: US 11,526,615 B2
(45) Date of Patent: Dec. 13, 2022

(54) SPECULATIVE SIDE-CHANNEL HINT INSTRUCTION

(71) Applicant: Arm Limited, Cambridge (GB)

(72) Inventors: Peter Richard Greenhalgh, Cambridge (GB); Frederic Claude Marie Piry, Alpes Maritimes (FR); Ian Michael Caulfield, Cambridge (GB); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 155 days.

(21) Appl. No.: 16/976,166

(22) PCT Filed: Mar. 12, 2019

(86) PCT No.: PCT/GB2019/050676
§ 371 (c)(1),
(2) Date: Aug. 27, 2020

(87) PCT Pub. No.: WO2019/193308
PCT Pub. Date: Oct. 10, 2019

(65) Prior Publication Data
US 2020/0410110 A1 Dec. 31, 2020

(30) Foreign Application Priority Data
Apr. 4, 2018 (GB) ..................... 1805488

(51) Int. Cl.
*G06F 21/57* (2013.01)
*G06F 9/30* (2018.01)
(Continued)

(52) U.S. Cl.
CPC ........ *G06F 21/577* (2013.01); *G06F 9/30047* (2013.01); *G06F 9/3842* (2013.01);
(Continued)

(58) Field of Classification Search
CPC .... G06F 21/577; G06F 9/4812; G06F 9/3842; G06F 11/3656; G06F 9/3861
See application file for complete search history.

(56) References Cited

U.S. PATENT DOCUMENTS 9,436,603 B1 * 9/2016 Pohlack .............. G06F 12/0808
9,892,783 B2 * 2/2018 Yoshimoto ............ G06F 3/0679
(Continued)

FOREIGN PATENT DOCUMENTS

| EP | 2 367 102 | 9/2011 |
|----|-----------|--------|
| GB | 2554096 | 3/2018 |
| WO | 2013/115820 | 8/2013 |

OTHER PUBLICATIONS

International Search Report and Written Opinion of the ISA for PCT/GB2019/050676, dated Jul. 3, 2019, 12 pages.
(Continued)

*Primary Examiner* — Viral S Lakhia
(74) *Attorney, Agent, or Firm* — Nixon & Vanderhye P.C.

(57) ABSTRACT

An apparatus comprises processing circuitry 14 to perform data processing in response to instructions, the processing circuitry supporting speculative processing of read operations for reading data from a memory system 20, 22; and control circuitry 12, 14, 20 to identify whether a sequence of instructions to be processed by the processing circuitry includes a speculative side-channel hint instruction indicative of whether there is a risk of information leakage if at least one subsequent read operation is processed speculatively, and to determine whether to trigger a speculative side-channel mitigation measure depending on whether the instructions include the speculative side-channel hint instruction. This can help to reduce the performance impact of measures taken to protect against speculative side-channel attacks.

17 Claims, 4 Drawing Sheets

(51) Int. Cl.
*G06F 9/38* (2018.01)
*G06F 11/36* (2006.01)
*G06F 21/55* (2013.01)
*G06F 21/71* (2013.01)

(52) U.S. Cl.
CPC ........ *G06F 9/3861* (2013.01); *G06F 11/3656* (2013.01); *G06F 21/556* (2013.01); *G06F 21/71* (2013.01)

(56) References Cited

U.S. PATENT DOCUMENTS

| | | | |
|---|---|---|---|
| 10,083,303 B2* | 9/2018 | Vedula | G06F 21/56 |
| 10,574,639 B2* | 2/2020 | Katoh | H04L 63/08 |
| 10,706,147 B1* | 7/2020 | Pohlack | H04L 63/1416 |
| 2008/0155679 A1 | 6/2008 | Sebot et al. | |
| 2009/0089564 A1* | 4/2009 | Brickell | G06F 9/30003 |
| | | | 712/E9.045 |
| 2013/0219187 A1* | 8/2013 | Furtner | G06F 21/755 |
| | | | 711/E12.001 |
| 2016/0098565 A1* | 4/2016 | Vedula | G06F 21/76 |
| | | | 726/24 |
| 2016/0148664 A1* | 5/2016 | Katoh | G09C 1/00 |
| | | | 365/148 |
| 2017/0286421 A1* | 10/2017 | Hayenga | G06F 16/172 |
| 2017/0345116 A1* | 11/2017 | Katoh | G06T 1/0028 |
| 2017/0346800 A1* | 11/2017 | Katoh | G06F 21/73 |

OTHER PUBLICATIONS

Combined Search and Examination Report for GB1805488.2, dated Sep. 28, 2018, 8 pages.
Kocher et al, "Spectre Attacks: Exploiting Speculative Execution", https://arxiv.com/pdf/1801.01203.pdf, arXiv.com, Jan. 3, 2018, 16 pages.
Israel et al: "Detection of the Meltdown and Spectre Vulnerabilities", https://research.checkpoint.com/detectionmeltdown-spectrevulnerabilities-using-checkpoint-cpu-level-technology, research.checkpoint.com. Jan. 9, 2018, 7 pages.
"Cache Speculation Side-channels", Whitepaper, Arm, Feb. 2018, 13 pages.

* cited by examiner

SPECULATIVE SIDE-CHANNEL HINT INSTRUCTION

This application is the U.S. national phase of International Application No. PCT/GB2019/050676 filed 12 Mar. 2019, which designated the U.S. and claims priority to GB Patent Application No. 1805488.2 filed 4 Apr. 2018, the entire contents of each of which are hereby incorporated by reference.

The present technique relates to the field of data processing.

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support load speculation where the value loaded from memory is predicted before the real value is actually returned from the memory, to allow subsequent instructions to be processed faster. Other forms of speculation are also possible.

At least some examples provide an apparatus comprising: processing circuitry to perform data processing in response to instructions, the processing circuitry supporting speculative processing of read operations for reading data from a memory system; and control circuitry to identify whether a sequence of instructions to be processed by the processing circuitry includes a speculative side-channel hint instruction indicative of whether there is a risk of information leakage if at least one subsequent read operation is processed speculatively, and to determine whether to trigger a speculative side-channel mitigation measure depending on whether the instructions include the speculative side-channel hint instruction.

At least some examples provide a data processing method comprising: performing data processing in response to instructions using processing circuitry supporting speculative processing of read operations for reading data from a memory system; identifying whether a sequence of instructions to be processed by the processing circuitry includes a speculative side-channel hint instruction indicative of whether there is a risk of information leakage if at least one subsequent read operation is processed speculatively; and determining whether to trigger a speculative side-channel mitigation measure depending on whether the instructions include the speculative side-channel hint instruction.

At least some examples provide a computer-implemented method for generating a sequence of program instructions for processing by processing circuitry, the method comprising: analysing input program code to identify whether the operations represented by the program code include a speculation-side-channel-activating pattern of operations including a read operation for reading data from a memory system, for which there is a risk of information leakage if the read operation is processed speculatively by the processing circuitry; generating the sequence of program instructions based on the input program code; and selecting, depending on whether the program code includes the speculation-side-channel-activating pattern of operations, whether to insert into the generated sequence of program instructions at least one speculative side-channel hint instruction indicative of whether there is a risk of information leakage if at least one subsequent read operation is processed speculatively.

A computer program may be provided for controlling a data processing apparatus to execute the method for generating the sequence of program instructions as discussed above. The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

Figure 6:
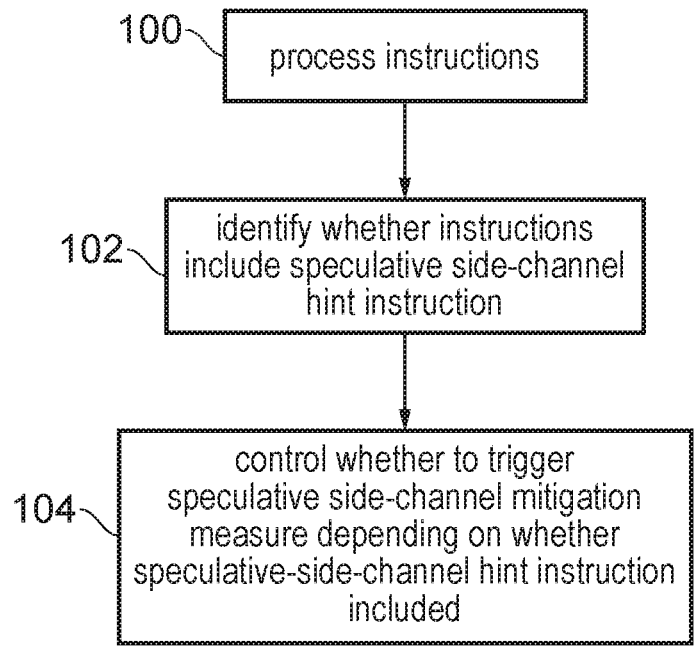
Figure 7:
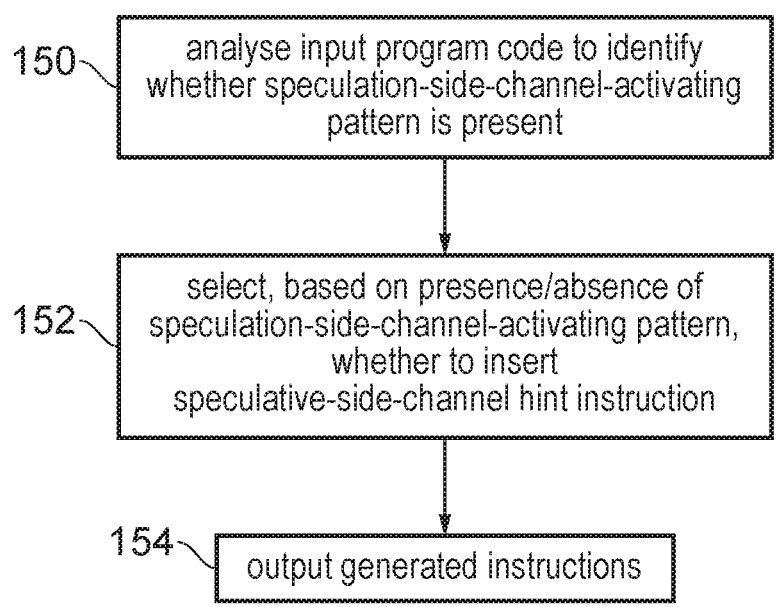

FIG. 6 illustrates a method of processing instructions and controlling whether to trigger a speculative side-channel mitigation measure depending on the presence of absence of a speculative side-channel hint instruction; and FIG. 7 shows a method of generating a sequence of program instructions for processing by processing circuitry, based on analysis of whether the operations to be performed include a speculative-side-channel-activating pattern of operations.

A data processing apparatus may have mechanisms for ensuring that some data in memory cannot be accessed by certain processes executing on the processing circuitry. For example privilege-based mechanisms and/or memory protection attributes may be used to control the access to certain regions of memory. Recently, it has been recognised that in systems using speculative execution and data caching, there is a potential for a malicious person to gain information from a region of memory that they do not have access to, by exploiting the property that the effects of speculatively executed instructions may persist in a data cache even after any architectural effects of the speculatively executed instructions have been reversed following a misspeculation. Such attacks may train branch predictors or other speculation mechanisms to trick more privileged code into speculatively executing a sequence of instructions designed to make the privileged code access a pattern of memory addresses dependent on sensitive information, so that less privileged code which does not have access to that sensitive information can use cache timing side-channels to probe which addresses have been allocated to, or evicted from, the cache by the more privileged code, to give some information which could allow the sensitive information to be deduced. Such attacks can be referred to as speculative side-channel attacks.

A number of mitigation measures can be taken to reduce the risk of information leakage due to speculative side-channel attacks. Various examples of speculative side-channel mitigation measure are discussed in more detail below. However, in general the speculative side-channel mitigation measure may typically reduce processing performance compared to the performance achieved if the speculative side-channel mitigation measure was not taken. The inventors recognised that applying the speculative side-channel mitigation measure by default to all operations may unnecessarily sacrifice performance, because in practice it is only certain patterns of operations which may provide a risk of information leakage through side-channel attacks. The patterns of instructions which may be at risk of potentially invoking speculation side-channel attacks, or which can be detected as not causing such a risk, may be able to be detected in advance.

In the technique discussed below, the processing circuitry may be provided with control circuitry for identifying whether a sequence of instructions to be processed by the processing circuitry includes a speculative side-channel hint instruction indicative of whether there is a risk of information leakage if at least one subsequent read operation is processed speculatively. The control circuitry can determine whether to trigger a speculative side-channel mitigation measure depending on whether the instructions to be processed include the speculative side-channel hint instruction. For example, the hint instruction could be inserted by software at compile time or link time based on analysis of the code to be executed, to indicate whether data from a given read could be used as a control operand to generate the address of another read. Hence, by using the hint instruction to flag the points of the code at which the speculative side-channel mitigation measure may be required or can be omitted, this can allow the processing circuitry to adopt a less conservative approach in mitigating against speculative side-channel attacks. On at least some occasions, the mitigation measure may be omitted when the presence or absence of the hint instruction indicates that it is safe to do so. This can enable performance to be improved, for example by permitting more aggressive speculation and/or more efficient use of caches.

The speculative side-channel hint instruction can be implemented in different ways. In one example, the speculative side-channel hint instruction may indicate that at least one subsequent read operation is safe to perform speculatively without the speculative side-channel mitigation measure. In this case, the control circuitry may determine that when the hint instruction is detected, it is acceptable to omit the speculative side-channel mitigation measure. On the other hand, for given read operations which do not follow an earlier speculative side-channel hint instruction, the speculative side-channel mitigation measure could be triggered. Hence, in this case it may be the absence of a hint instruction which may be assumed by default to indicate that it is not safe to carry out subsequent read without the mitigation measure.

Alternatively, in other approaches the hint instruction could be used to mark the unsafe instructions, and any other read operations which do not follow an associated hint instruction being considered to be safe. Hence, the speculative side-channel hint instruction may indicate that at least one subsequent read operation is unsafe to perform speculatively without the speculative side-channel mitigation measure. In this case, the speculative side-channel mitigation measure may be triggered by the control circuitry for a given read operation when an earlier speculative side-channel hint instruction is associated with a given read operation. Otherwise, in the absence of an earlier associated hint instruction, the mitigation measure could be omitted for the given read operation.

For one form of the speculative side-channel hint instruction, the hint may apply to a single subsequent instruction and may indicate whether there is a risk of information leakage if at least one read operation triggered by that single subsequent instruction is processed speculatively. The subsequent instruction to which the hint applies could be the immediately following instruction, regardless of whether that instruction triggers the read operation or not. Alternatively, the instruction to which the hint instruction applies could be the next instruction that does trigger a read operation, even if there is at least one intervening instruction which does not trigger a read.

Alternatively, the hint instruction may be associated with a block of subsequent instructions and may indicate whether there is a risk of information leakage if at least one read operation triggered by any of the block of subsequent instructions is processed speculatively. The block of subsequent instructions could be defined as a predetermined number of subsequent instructions, or could be defined using a memory range so that any instructions whose addresses are within the specified memory range (e.g. within a given address offset from the address of the hint instruction) could be assumed to be governed by the hint instruction.

In the case where the hint instruction applies to a block of subsequent hint instructions, then when a hint cancelling event occurs partway through processing of operations corresponding to the block of subsequent instructions, the control circuitry may determine whether to perform the speculative side-channel mitigation measure for remaining instructions of the block as if the block of instructions was not preceded by the speculative side-channel hint instruction. Hence, certain events may be deemed to cancel the effects of an earlier hint instruction. For example, the hint cancelling event could be at least one of: an exception or interrupt, a branch, an entry to a debug state, and/or a break point for triggering a diagnostic action. Any of these events could indicate that the block of instructions are not being executed contiguously, and so there could be a risk of other instructions being executed in between, which could mean that any decision made based on the hint may not be valid. This approach of cancelling the effects of an earlier hint may be particularly useful in systems where the default assumption is that reads are unsafe unless preceded by an earlier hint instruction.

In some examples, the speculative side-channel hint instruction may be interpreted as an architectural no-operation instruction, which does not trigger any change to architectural state (e.g. register state) of the processor.

In some examples, the control circuitry may annotate cached instructions or micro-operations based on whether the speculative side-channel hint instruction is present in the sequence of instructions. Micro-operations may be instructions in the form in which the execution circuitry of the processor executes the instructions. Some program instructions fetched from memory could be decoded into multiple micro-operations each performing a part of the functionality of the program instruction. Other program instructions could be mapped to a single micro-operation. Some micro-operations which were decoded from different program instructions could also be fused into a single micro-operation for processing by the execute stage. Where a cache is provided to cache instructions or micro-operations, the speculative side-channel hint instruction could occupy a slot which could have been taken by other instructions or micro-operations. In some example implementations, the control circuitry could annotate other instructions or micro-operations, such as the subsequent read instruction or micro-operations to which the hint applies, to indicate whether the hint instruction was or was not present in the original sequence of instructions. This could then allow the hint instruction itself to be omitted from the cache to free up the slot for another instruction or micro-operation which does provide an architectural effect on the processing state. Hence, in some cases the control of whether to perform the speculative side-channel mitigation measure could originally have been based on the hint instruction, but may then subsequently be based on annotation information allocated to cache based on the presence of the hint instruction or the absence of the hint instruction.

A number of different forms of speculative side-channel mitigation measure can be used to guard against potential speculative side-channel attacks. Any of the following examples may be used, either individually or in combination. The hint instruction may be used to control whether or not any of these measures are taken for a given read instruction or micro-operation.

In one example, the speculative side-channel mitigation measure may comprise disabling speculative execution of read micro-operations. This ensures that an attacker cannot use a misspeculation, such as a branch prediction or load value misprediction, as a means to cause more privileged code to execute an instruction to load secret information which should not have been executed.

Another example of a speculative side-channel mitigation measure may be to reduce a maximum number of micro-operations which can be executed speculatively beyond the youngest resolved non-speculative micro-operation. By performing less aggressive speculation this can reduce the window of operation for an attacker to change cache state based on a read access to an address derived from an incorrectly loaded secret value.

Another example of the mitigation measure may be to insert, into a sequence of micro-operations to be processed by the processing circuitry, a speculation barrier micro-operation for controlling the processing circuitry to disable speculative processing of micro-operations after the speculation barrier micro-operation until any micro-operations preceding the speculation barrier micro-operation have been resolved. For example the barrier may be inserted between successive read instructions to ensure that if the first read is incorrectly speculated, a subsequent read (potentially based on secret information incorrectly read by the first read) will not be executed.

Another approach to mitigate against the side-channel attacks may simply be to slow or halt processing by the processing circuitry for a period. By slowing the pipeline, this effectively reduces the number of micro-operations which will be executed speculatively before an earlier micro-operation is resolved, again effectively reducing the window of opportunity for the attacker to gain information from incorrectly read secret data.

Other approaches to mitigate against speculative side-channel attacks may focus not on the speculation, but on data caching of the data loaded by the speculative read operations. For example, the speculative side-channel mitigation measure could be that values loaded in response to a speculative read are not cached or are placed in a temporary buffer or speculative region of a cache which is flushed upon a misspeculation and is only allowed to influence the main non speculative cache data if the speculation is determined to be correct. Also the speculative side-channel mitigation measure could comprise flushing or invalidating at least a portion of a data cache for caching data read in response to speculative read operations. These mitigations may focus not on reducing the aggressiveness of speculation, but on whether the effects of such speculations are visible to other operations, which can again mitigate against the ability of the attacker to use cache timing side-channels in order to probe what data was loaded speculatively.

It will be appreciated that these are just some of the potential mitigations which could be taken. In general, the presence/absence of the hint instruction may be used to control whether any of these steps are taken.

A computer-implemented method may be provided to generate a sequence of program instructions for processing by the processing circuitry, including the speculative side-channel hint instruction as discussed above. Input program code identifying the operations to be performed by the processing circuitry may be analysed to identify whether the operations represented by the program code include a speculative side-channel-activating pattern of operations which include a read operation for reading data from a memory system, for which there is a risk of information leakage if the read operation is processed speculatively by the processing circuitry. Based on the input program code, the sequence of program instructions to be processed by the processing circuitry may be generated. Depending on whether the program code included the speculation-side-channel-activating pattern of operations, at least one speculative side-channel hint instruction may be inserted which indicates whether there is a risk of information leakage if at least one subsequent read operation is processed speculatively. For example, this method could be performed at compile or link time by software which evaluates the operations to be performed and inserts hints as required depending on whether any suspect patterns of operations have been identified. As discussed above, the hints could be inserted either ahead of safe passages of instructions or ahead of potentially unsafe passages. Alternatively, this method could be performed dynamically at the time of execution of a given piece of program code, for example using a just in time compiler or translator or using dynamic recompilation that profiles the execution.

In one example, the speculation-side-channel-activating pattern of operations, which is identified to determine whether or not to include the hint instructions, may be a sequence of operations which includes a producer read operation and a consumer read operation, for which a target address of the consumer read operation depends on a data value read from a memory system in response to the producer read operation.

A computer program may be provided for controlling a data processing apparatus to execute this method of generating the program instructions. This computer program could be executed on the same processing apparatus which would then subsequently execute the generated program instructions or an entirely separate compute such as a computer running a compiler compiling code for execution on a target data processor. This computer program may be stored on a storage medium, which may be a non-transitory storage medium.

Figure 1:
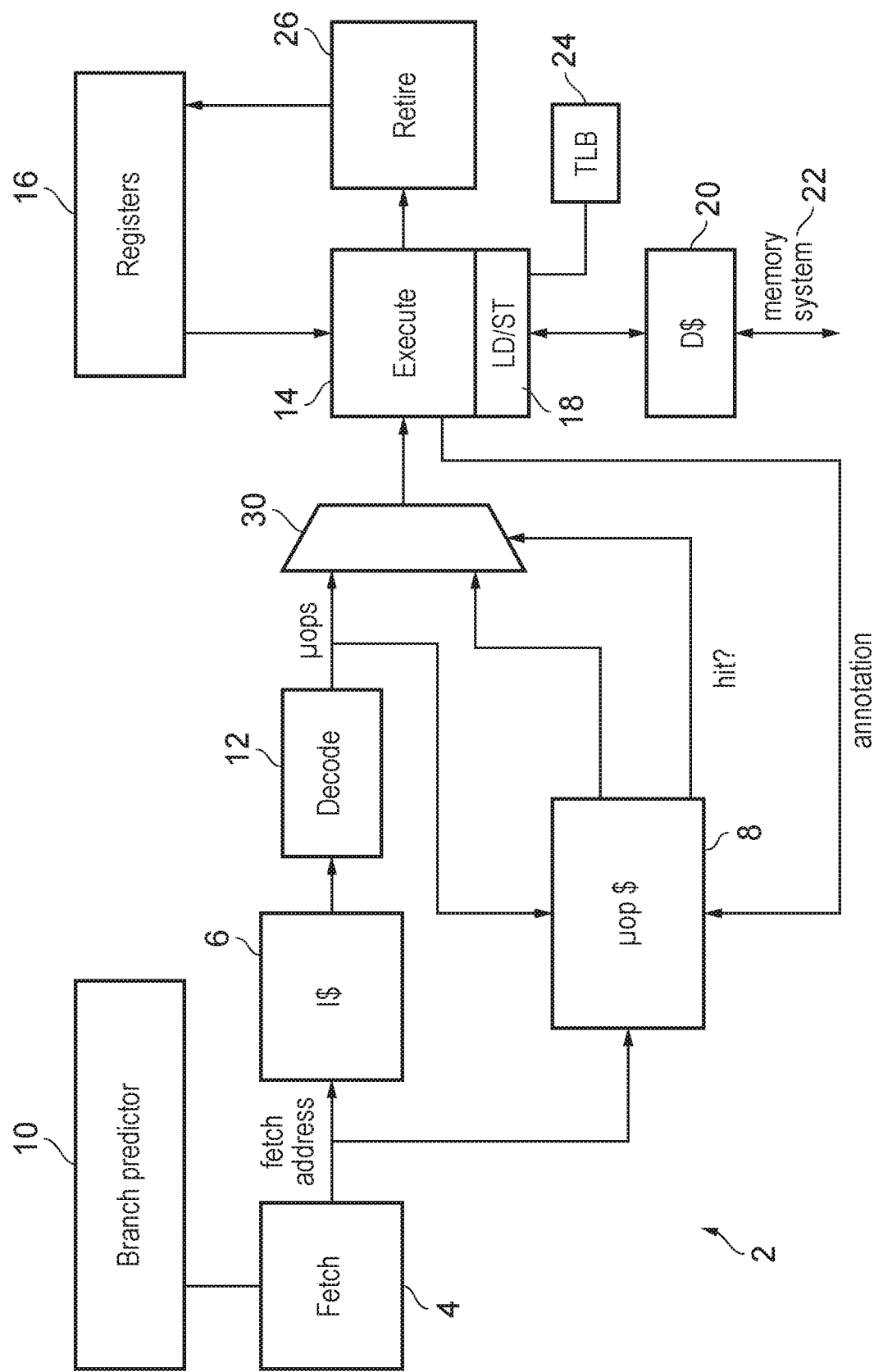

FIG. 1 schematically illustrates an example of a data processing apparatus 2 having a processing pipeline for processing instructions of a program to carry out processing operations. The pipeline includes a fetch stage 4 for identifying the address of the next instruction to be processed in the program flow, which is output as a fetch address to an instruction cache 6 and to a micro-operation cache (or trace cache) 8. The fetch stage 4 may determine a fetch address based on a branch predictor 10 for predicting outcomes of branch instructions. The instruction cache 6 caches instructions in the same form as which the instructions are defined in the program code stored in memory. Instructions from the instruction cache 6 are provided to a decode stage 12 where the instructions are decoded into micro-operations (μops or uops) to be executed by an execute stage 14. Some program instructions may map to a single micro-operation, while other program instructions may map to multiple separate micro-operations each corresponding to part of the functionality of the program instruction. For example, a load/store micro-operation for reading data from memory or storing data to memory could be split into an address generation micro-operation for calculating the address of the load or store and a data access micro-operation for actually triggering the access to the memory system based on the calculated address. Another example can be an arithmetic operation which could be represented by a single program instruction in memory but may be decomposed into a number of simpler micro-operations for processing separately by the execute stage 14.

The execute stage 14 may include a number of execution units for processing different types of micro-operation, for example an arithmetic/logical unit (ALU) for processing arithmetic or logical micro-operations based on integer operands read from registers 16, a floating point unit for performing operations on floating points operands read from the registers, and/or a vector processing unit for performing vector processing operations which use operands from the register 16 which specify a number of independent data values within the same register. One of the execute units of the execute stage 14 may be a load/store unit 18 for processing read operations to read data from a data cache 20 or memory system 22 (which could include further caches and main memory) and write operations to write data to the data cache 20 or memory system 22. The load/store unit may use page table entries within a translation lookaside buffer (TLB) 24 to determine whether, in a current execution state, the processor is allowed to access the region of memory identified by a target address of a read or write (load or store) operation. For example the TLB may restrict access to certain memory regions to certain modes or privilege levels of the processor.

Instructions executed by the execute stage 14 are retired by a retire (or write back) stage 26, where the results of the instructions are written back to the register 16. The processing pipeline may support speculative execution of micro-operations, for example based on predictions made by the branch predictor 10 or other speculative elements such as data prefetchers or load value predictors, and so the retire stage 26 may also be responsible for evaluating whether predictions have been made correctly and may trigger results of speculatively executed operations to be discarded in the event of a misprediction. Following a misprediction, incorrectly speculated instructions can be flushed from the pipeline, and execution can resume from the last correct execution point before the incorrect prediction was made.

The micro-operation cache (or trace cache) 8 may be provided to speed up processing and save power by eliminating the need to invoke the decode stage 12 as often. Hence, the micro-operations, which are decoded by the decode stage 12 based on program instructions from the instruction cache 6 or fused from multiple separate decoded micro-operations, can be cached in the micro-operation cache or trace cache 8 for access when program execution reaches a corresponding fetch address again in future. The micro-operation cache 8, if provided, may cache micro-operations without regard to the sequence in which they are executed. For example the micro-operation cache may have a number of entries which are tagged based on the fetch address of the instruction corresponding to that micro-operation. Hence, in parallel with inputting the fetch address into the instruction cache 6, the fetch address can also be supplied to the micro-operation cache, and if there is a hit in the micro-operation cache then this may control a multiplexer 30 to select a micro-operation output by the micro-operation cache instead of the micro-operation decoded by the decode stage 12. Also a signal from the micro-operation cache may be used to place at least part of the decode stage 12 in a power saving state when there is a hit in the micro-operation cache.

If a trace cache is provided, then it may operate in a similar way to the micro-operation cache, except that the trace cache may not only cache the micro-operations themselves, but may also track a sequence in which those micro-operations were actually executed by the execute stage 14. For example, a trace of executed micro-operations may include successive branch operations and may string together different blocks of micro-operations which were executed between the branches so as to provide a single entry in the trace which can be fetched as a contiguous block of operations for execution by the execute stage 14, without the fetch stage 4 needing to individually recalculate each successive fetch address in response to each of the processed micro-operations. Also, whereas the micro-operation cache may cache speculatively executed micro-operations which may then subsequently turn out to have been incorrect, the trace cache 8 may cache the correctly executed sequences of micro-operations (traces corresponding to incorrectly speculated operations may be invalidated). It will be appreciated that some systems could have only one of a micro operation cache and a trace cache while other systems may have both.

One benefit of providing the micro-operation cache or the trace cache is this can permit further performance optimisations by fusing multiple micro-operations decoded by the decode stage 12 in response to separate program instructions into a single common micro-operation, if the processing units in the execute stage 14 support processing a combined micro-operation. By fusing micro-operations when possible then this reduces the amount of pipeline utilisation required for that operation, freeing up pipeline slots for executing other operations, which can help to improve performance.

Speculation-based cache timing side-channels using speculative memory reads have recently been proposed. Speculative memory reads are typical of advanced microprocessors and part of the overall functionality which enables very high performance. By performing speculative memory reads to cacheable locations beyond an architecturally unresolved branch (or other change in program flow), and, further, using the result of those reads themselves to form the addresses of further speculative memory reads, these speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code, but the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1    struct array {
2        unsigned long length;
3        unsigned char data[ ];
4    };
5    struct array *arr = ...;
6    unsigned long untrusted_offset_from_user = ...;
7    if (untrusted_offset_from_user < arr->length) {
8        unsigned char value;
9        value =arr->data[untrusted_offset_from_user];
10       ...
11   }
```

In a modern micro-processor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1    struct array {
2        unsigned long length;
3        unsigned char data[ ];
4    };
5    struct array *arr1 = ...; /* small array */
6    struct array *arr2 = ...; /*array of size 0x400 */
7    unsigned long untrusted_offset_from_user = ...;
8    if (untrusted_offset_from_user < arr1->length) {
9        unsigned char value;
10       value =arr1->data[untrusted_offset_from_user];
11       unsigned long index2 =((value&1)*0x100)+0x200;
12       if (index2 < arr2->length) {
13           unsigned char value2 = arr2->data[index2];
14       }
15   }
```

In this example, "value", which is loaded from memory using an address calculated from arr1→data combined with the untrusted_offset_from_user (line 10), is then used as the basis of a further memory access (line 13). Therefore, the speculative load of value2 comes from an address that is derived from the data speculatively loaded for value. If the speculative load of value2 by the processor causes an allocation into the cache, then part of the address of that load can be inferred using standard cache timing side-channels. Since that address depends on data in value, then part of the data of value can be inferred using the side-channel.

By applying this approach to different bits of value (in a number of speculative executions) the entirety of the data of value can be determined. Hence, the untrusted software can, by providing out-of-range quantities for untrusted_offset_from_user, access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

Hence, it may be desirable to provide counter-measures against this type of attack. A number of mitigation measures could be used. For example, read operations for reading data from the data cache 20 or memory system 22 could be prevented from being performed speculatively, or speculation could be applied less aggressively by slowing down the pipeline or reducing the number of instructions which can be executed speculatively while waiting for an earlier instruction to be resolved, which can reduce the window of opportunity for an attacker to exploit the type of attack discussed above. Other approaches can provide a speculation barrier instruction which can be inserted when a number of control-dependent read operations are detected, to separate the consumer read which has its target address calculated based on an earlier data value read from memory from the producer read which reads that data value from memory, with the barrier instruction instructing the pipeline that it cannot speculatively execute the second read while the first read remains speculative. This ensures that if the first read should never have been executed, then the barrier ensures that it will be cancelled before the second read is encountered. Other approaches can be taken to reduce the effect on cache state by incorrectly speculatively executed read operations. For example, the data cache 20 could be split into a main cache region used for non-speculative data and a speculative cache region used for data read in response to speculatively executed read operations while the read remains speculative. The data may be promoted to the main region when the speculation has been resolved as correct and the contents of the speculative region could be discarded when an event indicating an increased risk of attack is identified, such as switching to a less privileged mode of execution. Also, in some cases additional cache flushes may be performed to invalidate at least speculatively read data from the cache when a pattern of operations deemed at risk of attack is detected.

A common factor between any of these mitigation measures is that they tend to reduce the performance achieved by the processor as they either mean that instructions which could have been executed speculatively are held back or that additional cache misses are incurred for some subsequent read operations to delay those reads and any operations dependent on those reads. While such mitigation measures can be effective at preventing the attacks, they may unnecessarily harm performance for some program code which does not contain a pattern of operations which could be used to trigger the side-channel attack.

In practice, it is possible to identify sequences of instructions that will not be used in any downstream control dependencies, and if so then for these instructions no performance limiting precautions may need to be taken.

Figure 2:
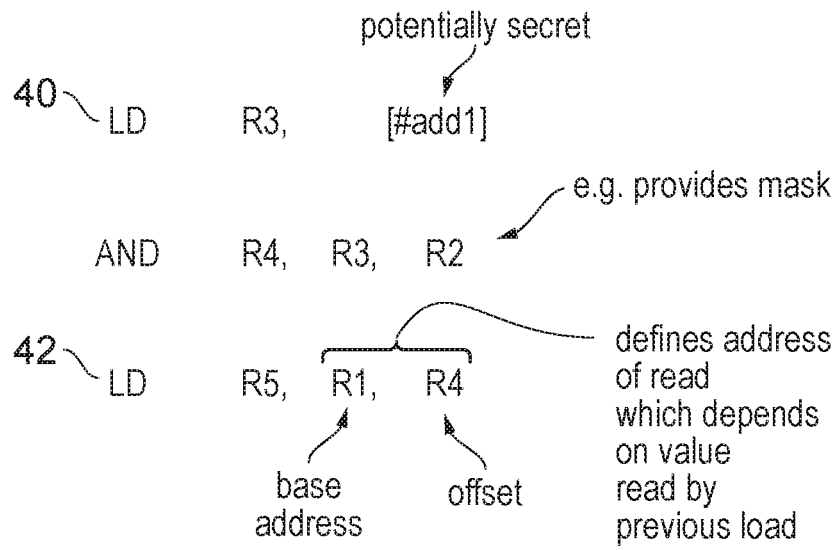
FIG. 2 shows an example of a pattern of instructions which could potentially be used to invoke a speculative side-channel attack.

For example, FIG. 2 shows an example of a sequence of operations which could be deemed to have a risk of information leakage through speculative side-channel attacks. This sequence of instructions includes a consumer read operation 40 which reads a data value from a given address #add1 and stores the read data value in register R3. The data value at #add1 could potentially be a secret value which is not accessible to some processes executing on the processor 2. This is followed by one or more intermediate instructions for calculating a value based on the loaded data value, for example an AND instruction which combines the loaded value with a mask defined in register R2 to set an index value in destination register R4. In some cases, multiple separate instructions may generate the index value from the loaded data value. Subsequently, a consumer load 62 takes the index specified in register R4 and uses this as an offset to combine with a base address in register R1, to obtain the address of a subsequent read operation which reads a data value from memory and places it in a destination register R5.

Hence, this sequence comprises a consumer load 42 whose target address depends on the value read by an earlier load 40. Hence, if the producer load is incorrectly speculated then even if this misspeculation is detected later by the time the consumer load has been executed, the effects of the consumer load 42 on the data cache 20 may still be visible to an attacker who did not have access to the secret data loaded by the producer load 40.

In contrast, for program code including a read instruction whose data value can never be used to calculate the address of another read (e.g. because the read data, and any data depending on the read, is overwritten before it can be used to calculate the address of any subsequent read), it may not be necessary to take measures for mitigating against the risk of attacks.

Figure 3:
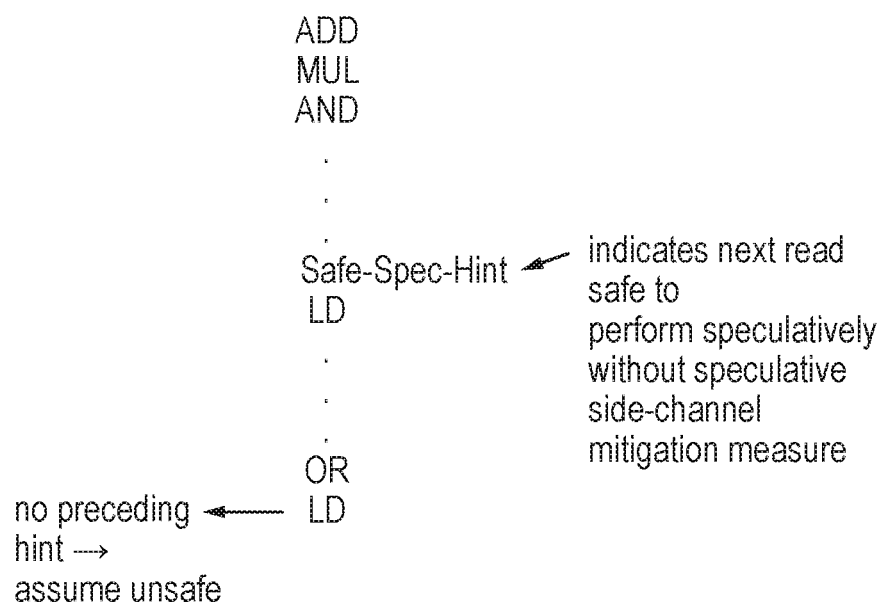
FIG. 3 shows an example of using a speculative side-channel hint instruction to mark a subsequent read operation as safe to perform without a speculative side-channel mitigation measure.
Figure 4:
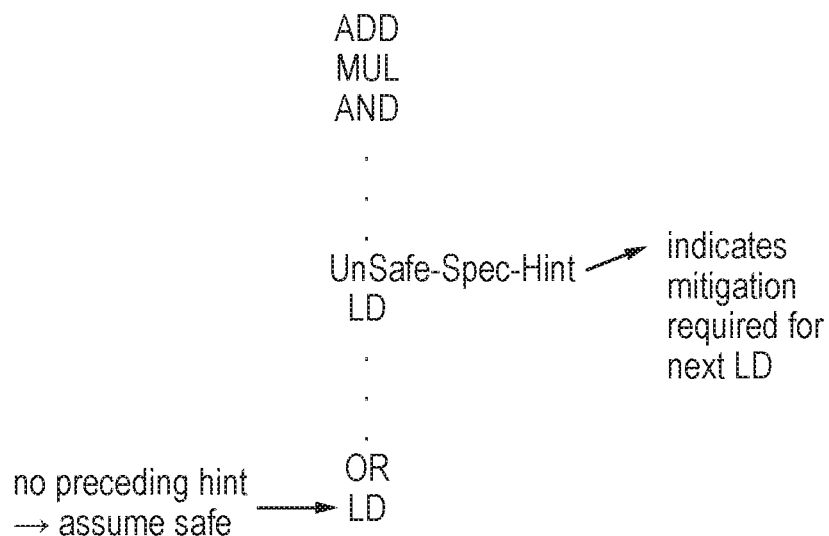
FIG. 4 shows an alternative where the hint instruction is used to mark the subsequent read operations which are potentially unsafe.
Figure 5:
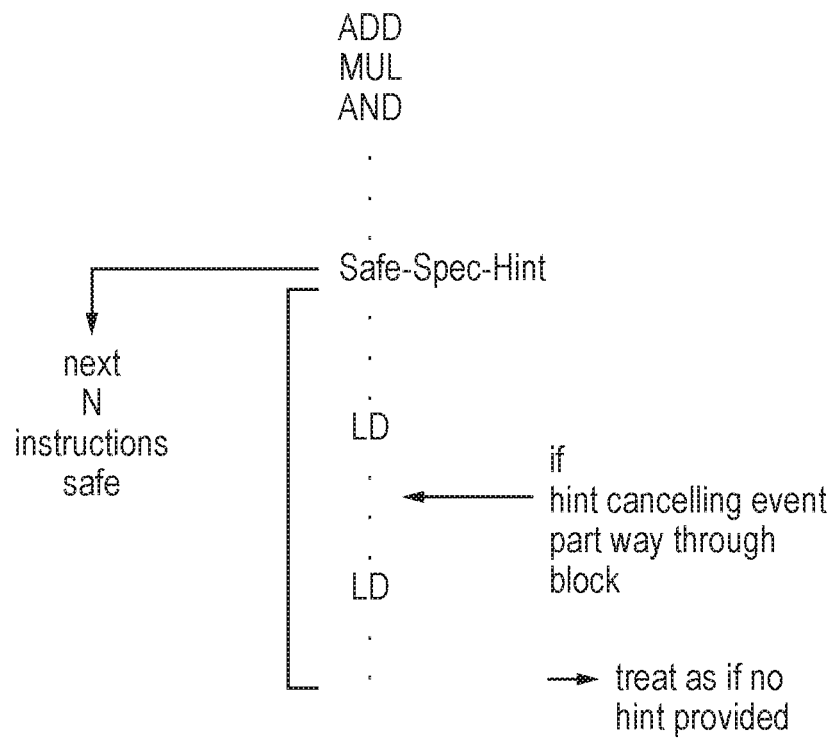
FIG. 5 shows another alternative where the hint instruction applies to multiple subsequent instructions.

FIGS. 3 to 5 show several examples of hint instructions that may be added by software compile/link time or dynamically at execute time through just in time (JIT) compilation or dynamic recompilation, or could be inserted by hardware profiling the executed instructions, to indicate whether data from the next read or next group of reads is likely to be used as a control operand. This means the processing pipeline can determine, based on the presence or absence of the hint instruction, whether it is safe to perform these reads speculatively without the speculative side-channel mitigation measure.

FIG. 3 shows a first example of the hint instruction which can be used to flag instructions or micro-operations which are safe to perform without mitigation measure. In this example the hint instruction is assumed to apply to the immediately following read instruction. In this case, read instructions which do not have any preceding hint instruction may be assumed to be unsafe and hence require the mitigation measure to be performed. The hint instruction may be an architectural no-operation (NOP) instruction which has no effect on the processor state other than controlling whether the mitigation measure is performed.

FIG. 4 shows a second example where the hint instruction is instead used to mark the unsafe reads, with read instructions which do not have a preceding hint being assumed to be safe. In this case, it may be the presence of the hint instruction which triggers the speculative side-channel mitigation measure to be performed, rather than the absence of the hint instruction as in FIG. 3.

FIG. 5 shows another example in which the safe-speculation-hint instruction applies to a block of N subsequent instructions, indicating whether any read operation triggered by any of those N instructions should be considered safe to perform without the mitigation measure. For the example of FIG. 5, the hint instruction is defined similar to that of FIG. 3 where the presence of the hint instruction indicates that any reads triggered by the subsequent block of instructions are safe. It would also be possible to provide a corresponding version of the block-hint instruction similar to FIG. 4 which indicates a subsequent block of unsafe instructions which do require the mitigation measure. While the example of FIG. 5 defines the block of subsequent instructions as a certain predetermined number N of instructions or micro-operations, another way of defining the subsequent block may be in terms of a predetermined address offset relative to the address of the hint instruction, so that any instructions whose address are within that address range are considered safe or unsafe as indicated by the hint instruction.

In some case, the instruction cache 6 or the micro-operation cache (or trace cache) 8 could be annotated with information derived from the hint instructions. For example, an instruction which triggers a read operation could be marked with an annotation indicating whether there was a preceding hint instruction which applied to that read. This could allow the hint instructions themselves to be omitted from the instruction cache 6. A similar approach could be used for micro-operations in the micro-operation cache 6.

FIG. 6 is a flow diagram illustrating a method of processing instructions using the processor shown in FIG. 1. At step 100 micro-operations corresponding to instructions fetched from memory are decoded into micro-operations ready for processing by the execute stage 14. At step 102 the instruction decoder identifies whether any of the instructions to be processed is a speculative side-channel hint instruction indicating whether there is a risk of information leakage if at least one subsequent read operation is processed speculatively. At step 104, control circuitry associated with the processor 2 determines whether to trigger a speculative side-channel mitigation measure depending on whether the speculative side-channel hint instruction was included in the instructions. This control circuitry could for example be the instruction decoder 12 itself, or could be some circuitry associated with the execute stage 14 which controls the extent of speculation or controls halting of the pipeline if required to ensure that a given operation is performed non-speculatively, or could include some circuitry associated with the data cache 20 which controls how results of a read operation are cached. Hence, it will be appreciated that there may be range of different parts of the overall data processing system which may control aspects of speculation/caching to control whether the speculative side-channel mitigation measure is performed, depending on whether the hint instruction is included.

FIG. 7 is a flow diagram showing a method of preparing program instructions for execution by a processor. At step 150 input program code is received which identifies the operations to be performed. The input program code could be a set of instructions written according to the same instruction set architecture which the processor will execute. However, the input program code could also be written according to a higher level programming language (e.g. C) which is to be compiled into instructions from the instruction set architecture supported by the processor which is to execute the code. At step 150 the input program code is analysed to identify whether any speculation-side-channel-activating pattern is present. For example, the speculationside-channel-activating pattern could be a sequence of instructions such as shown in FIG. 2, which includes a producer load 40 which reads a value from memory and a consumer load 42 which has an address calculated based on the value read from by the producer load. In some cases, the analysis could, instead of attempting to spot sequences which definitely do map to the suspect sequence which could invoke the attack, instead look for sequences of instructions which can be guaranteed to be safe from attack. For example, if it can be detected that the data value read by a given load instruction will never be used to generate the address of any subsequent load, then it could be marked as safe. In some cases sequences of operations which cannot be definitively determined to be safe could by default be assumed to contain a speculation-side-channel-activating pattern of operations which could cause a risk of information leakage. Hence, in some cases the identified patterns could simply be any pattern which does not match properties of a safe pattern of operations.

At step 152, it is selected, based on the presence or absence of the speculation-side-channel-activating pattern identified at step 150, whether to insert the speculation-side-channel hint instruction. For some forms of the instruction, the hint instruction may be inserted when the speculation-side-channel-activating pattern is detected, while for other forms of the hint instruction the hint instruction could be inserted in the absence of such a pattern. At step 154 the generated instructions, including any inserted hint instructions, are then output where they can be saved to a memory or a recording medium for subsequent execution by the target processor. The generated instructions could comprise the same instructions of the input program code, now expanded to include additional hint instructions, or could comprise an entirely different set of instructions, for example translated or compiled into a different programming language or instructions.

The method of FIG. 7 could be performed in software by a compiler or just in time translator. The compiler/translator software may be stored on a recording medium. Alternatively, the method of FIG. 7 could be performed by a hardware element within the processor executing the program code, for example by analysis of the trace of the executed instruction stream by profiling circuitry which can generate additional hint micro-operations to insert into the micro-operation cache to act in the same way as the hint instructions discussed above.

In summary, by supporting hint instructions which can be used to control whether it is necessary to perform a side-channel mitigation measure, performance can be approved by enabling more aggressive speculation and/or less restricted caching in cases when it is safe to do so. The presence of a few additional hint instructions (which could sometimes occupy pipeline slots which could otherwise be taken by other instructions for carrying out actual processing operations) is unlikely to reduce pipeline throughput significantly, especially in modern processors which have a relatively wide fetch width (number of instructions fetched per cycle).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions, the processing circuitry supporting speculative processing of read operations for reading data from a memory system; and
control circuitry to identify whether a sequence of instructions to be processed by the processing circuitry includes a speculative side-channel hint instruction indicative of whether there is a risk of information leakage if at least one subsequent read operation is processed speculatively, and to determine whether to trigger a speculative side-channel mitigation measure depending on whether the instructions include the speculative side-channel hint instruction,
wherein the control circuitry is configured to trigger the speculative side-channel mitigation measure for a given read operation in the absence of an earlier speculative side-channel hint instruction associated with the given read operation.

2. The apparatus according to claim 1, in which the speculative side-channel hint instruction indicates that the at least one subsequent read operation is safe to perform speculatively without the speculative side-channel mitigation measure.

3. The apparatus according to claim 1, in which the speculative side-channel hint instruction is associated with a single subsequent instruction, and is indicative of whether there is a risk of information leakage if at least one read operation triggered by the single subsequent instruction is processed speculatively.

4. The apparatus according to claim 1, in which the speculative side-channel hint instruction is associated with a block of subsequent instructions, and is indicative of whether there is a risk of information leakage if at least one read operation triggered by any of the block of subsequent instructions is processed speculatively.

5. The apparatus according to claim 4, in which, in response to a hint cancelling event occurring part way through processing of operations corresponding to the block of subsequent instructions, the control circuitry is configured to determine whether to perform the speculative side-channel mitigation measure for remaining instructions of the block as if the block of subsequent instructions was not preceded by the speculative side-channel hint instruction.

6. The apparatus according to claim 5, in which the hint cancelling event comprises at least one of:
an exception or interrupt;
a branch;
an entry to a debug state; and
a breakpoint for triggering a diagnostic action.

7. The apparatus according to claim 1, in which the processing circuitry is configured to interpret the speculative side-channel hint instruction as an architectural no-operation instruction.

8. The apparatus according to claim 1, in which the control circuitry is configured to annotate cached instructions or micro-operations based on whether the speculative side-channel hint instruction is present in the sequence of instructions.

9. The apparatus according to claim 1, in which the speculative side-channel mitigation measure comprises disabling speculative execution of read micro-operations.

10. The apparatus according to claim 1, in which the speculative side-channel mitigation measure comprises reducing a maximum number of micro-operations which can be executed speculatively beyond the youngest resolved non-speculative micro-operation.

11. The apparatus according to claim 1, in which the speculative side-channel mitigation measure comprises inserting, into a sequence of micro-operations to be processed by the processing circuitry, a speculation barrier micro-operation for controlling the processing circuitry to disable speculative processing of micro-operations after the speculation barrier micro-operation until any micro-operations preceding the speculation barrier micro-operation have been resolved.

12. The apparatus according to claim 1, in which the speculative side-channel mitigation measure comprises slowing or halting processing of micro-operations by the processing circuitry.

13. The apparatus according to claim 1, in which the speculative side-channel mitigation measure comprises flushing or invalidating at least a portion of a data cache for caching data read in response to read micro-operations.

14. A data processing method comprising:
performing data processing in response to instructions using processing circuitry supporting speculative processing of read operations for reading data from a memory system;
identifying whether a sequence of instructions to be processed by the processing circuitry includes a speculative side-channel hint instruction indicative of whether there is a risk of information leakage if at least one subsequent read operation is processed speculatively;
determining whether to trigger a speculative side-channel mitigation measure depending on whether the instructions include the speculative side-channel hint instruction; and
triggering the speculative side-channel mitigation measure for a given read operation in the absence of an earlier speculative side-channel hint instruction associated with the given read operation.

15. A computer-implemented method for generating a sequence of program instructions for processing by processing circuitry, the method comprising:
analysing input program code to identify whether the operations represented by the program code include a speculation-side-channel-activating pattern of operations including a read operation for reading data from a memory system, for which there is a risk of information leakage if the read operation is processed speculatively by the processing circuitry;
generating the sequence of program instructions based on the input program code;
selecting, depending on whether the program code includes the speculation-side-channel-activating pattern of operations, whether to insert into the generated sequence of program instructions at least one speculative side-channel hint instruction indicative of whether there is a risk of information leakage if at least one subsequent read operation is processed speculatively; and
inserting, into the generated sequence of program instructions, the at least one speculative side-channel hint instruction when it is determined that the at least one subsequent read operation is safe to perform speculatively without the speculative side-channel mitigation measure.

16. The method of claim 15, in which the speculation-side-channel-activating pattern of operations comprises a sequence of operations including a producer read operation and a consumer read operation for which a target address of the consumer read operation depends on a data value read from the memory system in response to the producer read operation.

17. A non-transitory storage medium storing a computer program for controlling a data processing apparatus to execute the method of claim 15.

* * * * *